United States Patent
Kim

(10) Patent No.: US 10,081,333 B2
(45) Date of Patent: Sep. 25, 2018

(54) ELECTRIC VEHICLE CHARGING CONNECTOR ANTI-THEFT METHOD AND APPARATUS

(71) Applicant: Hyundai Motor Company, Seoul (KR)

(72) Inventor: Seong Un Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 171 days.

(21) Appl. No.: 15/130,420

(22) Filed: Apr. 15, 2016

(65) Prior Publication Data

US 2017/0217403 A1    Aug. 3, 2017

(30) Foreign Application Priority Data

Feb. 1, 2016    (KR) .................... 10-2016-0012288

(51) Int. Cl.
*H02J 7/00* (2006.01)
*B60R 25/01* (2013.01)
*B60L 11/18* (2006.01)
*B60R 25/104* (2013.01)
*B60R 25/24* (2013.01)

(52) U.S. Cl.
CPC .......... *B60R 25/01* (2013.01); *B60L 11/1818* (2013.01); *B60L 11/1846* (2013.01); *B60L 11/1848* (2013.01); *B60R 25/104* (2013.01); *B60R 25/24* (2013.01); *H02J 7/0036* (2013.01); *H02J 7/0047* (2013.01); *B60L 2230/16* (2013.01); *H02J 2007/0001* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
USPC ........................................................ 320/109
See application file for complete search history.

(56) References Cited

U.S. PATENT DOCUMENTS

| | | | |
|---|---|---|---|
| 6,356,186 B1 * | 3/2002 | Price ..................... | B60R 25/04 180/287 |
| 2007/0172064 A1 * | 7/2007 | Nonaka .................. | G06F 21/34 380/258 |

(Continued)

FOREIGN PATENT DOCUMENTS

| JP | H10-262303 A | 9/1998 |
|---|---|---|
| JP | 2007-236172 A | 9/2007 |
| JP | 2009-081917 A | 4/2009 |

(Continued)

*Primary Examiner* — Samuel Berhanu
(74) *Attorney, Agent, or Firm* — Mintz Levin Cohn Ferris Glovsky and Popeo, P.C.; Peter F. Corless

(57) ABSTRACT

A method for controlling a charging connector anti-theft apparatus includes: verifying a connection between a socket of a vehicle and a charging plug included in a charging connector outside of the vehicle; locking the socket and the charging plug upon initiation of charging the vehicle; determining unlock conditions of the charging plug through communication with a smart-key; and outputting a warning sound or warning light upon reception of a separation signal indicating that the socket and the charging plug have been separated when the determined unlock conditions are not satisfied.

20 Claims, 4 Drawing Sheets

(56) References Cited

U.S. PATENT DOCUMENTS

2013/0047687 A1\* 2/2013 Kurumizawa ...... B60L 11/1818
70/490
2014/0042966 A1\* 2/2014 Masuda .............. B60L 11/1818
320/109

FOREIGN PATENT DOCUMENTS

| JP | 2009-159814 A | 7/2009 |
| JP | 2010-104209 A | 5/2010 |
| JP | 2010-142096 A | 6/2010 |
| JP | 2010-168869 A | 8/2010 |
| JP | 2010-264847 A | 11/2010 |
| JP | 2015-023748 A | 2/2015 |

\* cited by examiner

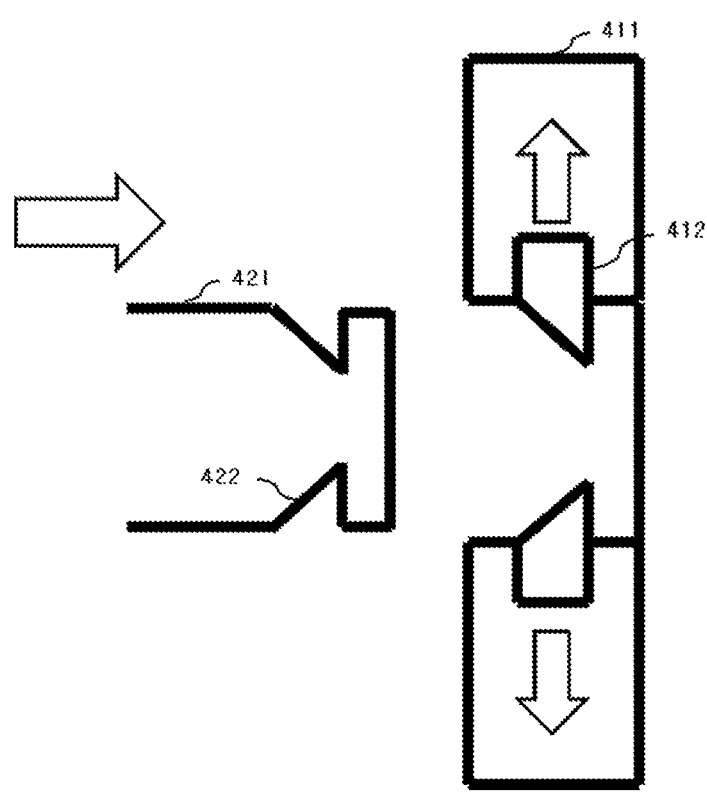

ELECTRIC VEHICLE CHARGING CONNECTOR ANTI-THEFT METHOD AND APPARATUS

CROSS-REFERENCE TO RELATED APPLICATION

This application claims the benefit of and priority to Korean Patent Application No. 10-2016-0012288, filed on Feb. 1, 2016, which is hereby incorporated by reference as if fully set forth herein.

BACKGROUND OF THE DISCLOSURE

Technical Field

The present disclosure relates generally to an electric vehicle and, more specifically, to an electric vehicle charging connector anti-theft method and apparatus.

Discussion of the Related Art

An electric vehicle (EV) or a plug-in hybrid electric vehicle (PHEV) equipped with a charging system is driven using an electric motor. The electric motor is powered by a battery included in the EV or PHEV, and such batteries need to be recharged after being discharged.

The EV or PHEV can be charged at specialized charging stations, such as gas stations, in such a manner that a charging plug of a charging apparatus—including a charging cable and the charging plug—is inserted into connecting parts (i.e., sockets) of the EV or PHEV to charge the vehicle. This process is known as on-site charging.

Alternatively, the EV or PHEV may be charged through charging connectors using a 220V electric current, typically used for home applications, according to "slow charging," e.g., in parking lots or other locations (other than specialized charging stations). In this case, four to six hours are required for single charging, and even quick charging generally requires 30 minutes to one hour.

Users can select "slow charging" or "quick charging" for the EV or PHEV according to charging situation. When an EV is charged through slow charging, a separate charging apparatus or a slow charging connector which is carried by a user can be used. Slow charging requires continuous charging for several hours (e.g., two hours or longer) for full charging since slow charging has a lower charging speed than quick charging.

The vehicle can remain in a charging state for hours, not only when the EV or PHEV is quick-charged using a charging apparatus in a specialized charging station, but also when the EV or PHEV is charged using a slow charging connector provided thereto. However, when the user leaves the EV or PHEV charging for hours, the charging connector may be separated from the vehicle or even stolen.

SUMMARY OF THE DISCLOSURE

An object of the present disclosure is to provide an electric vehicle charging connector anti-theft method and apparatus. Thus, the present disclosure relates to an electric vehicle charging connector anti-theft method and apparatus for preventing an EV or PHEV charging connector used for slow charging from being stolen. Specifically, the present disclosure provides an electric vehicle charging connector anti-theft method and apparatus for enabling a user to selectively activate an anti-theft system for an individual charging connector according to charging environment so as to reduce the risk of theft of an EV or components therefor even when the EV is charging for a long period of time in the absence of the user when the anti-theft system is activated.

The technical problems solved by the present disclosure are not limited to the above technical problems, and those skilled in the art may understand other technical problems from the following description.

According to embodiments of the present disclosure, a method for controlling a charging connector anti-theft apparatus includes: verifying a connection between a socket of a vehicle and a charging plug included in a charging connector outside of the vehicle; locking the socket and the charging plug upon initiation of charging the vehicle; determining unlock conditions of the charging plug through communication with a smart-key; and outputting a warning sound or warning light upon reception of a separation signal indicating that the socket and the charging plug have been separated when the determined unlock conditions are not satisfied.

The method may further include receiving information about whether the anti-theft mode is activated through an input unit. The locking of the socket and the charging plug may be performed when the anti-theft mode is activated.

The determining of the unlock conditions of the charging plug may include: receiving a user authentication result from a user authentication system that receives a user authentication signal from the smart-key; and determining the unlock conditions of the charging plug based on the user authentication result.

The determining of the unlock conditions of the charging plug may be performed when the separation signal is received from a separation button or when the user authentication system receives the user authentication signal from the smart-key at predetermined intervals.

The verifying of the connection between the socket and the charging plug may include verifying the connection by sensing a current or voltage between the socket and the charging plug.

The locking of the socket and the charging plug may include locking the socket and the charging plug through a latch included in the socket upon transmission of electric power from the charging plug to the socket.

The locking of the socket and the charging plug may include moving the latch to the charging plug by an actuator configured to be inserted and locked into a latch groove included in the charging plug.

The input unit may be included in a display device of a cluster or an Audio, Video, Navigation (AVN) system.

The input unit may receive information about whether the anti-theft mode is activated through a user interface of the cluster or the AVN system.

The method may further include: comparing, by the user authentication system, the user authentication signal with prestored user information; and generating, by the user authentication system, the user authentication result based on the comparison.

Furthermore, according to embodiments of the present disclosure, a charging connector anti-theft apparatus includes: a controller verifying a connection between a socket of a vehicle and a charging plug included in a charging connector outside of the vehicle, controlling the socket and the charging plug to be locked upon initiation of charging the vehicle, and determining unlock conditions of the charging plug based on a user authentication result; a communication unit receiving information about the user authentication result from a user authentication system in communication with a smart-key; and an output unit outputting a warning sound or warning light upon reception of a separation signal from the communication unit indicating that the socket and the charging plug have been separated when the determined unlock conditions are not satisfied.

The apparatus may further include an input unit receiving information about whether the anti-theft mode is activated. The socket and the charging plug may be locked when the anti-theft mode is activated.

The user authentication system may receive a user authentication signal from the smart-key, and the communication unit may receive the user authentication result from the user authentication system.

The controller may determine the unlock conditions when the separation signal is received from a separation button or when the user authentication system receives the user authentication signal from the smart-key at predetermined intervals.

The controller may verify the connection between the socket and the charging plug by sensing a current or voltage between the socket and the charging plug.

The controller may control the socket and the charging plug to be locked through a latch included in the socket upon transmission of electric power from the charging plug to the socket.

The controller may control the latch to be moved to the charging plug by an actuator configured to be inserted and locked into a latch groove included in the charging plug.

The input unit may be included in a display device of a cluster or an AVN system.

The input unit may receive information about whether the anti-theft mode is activated through a user interface of the cluster or the AVN system.

The user authentication system may compare the user authentication signal with prestored user information and generate the user authentication result based on the comparison.

Furthermore, according to embodiments of the present disclosure, a non-transitory computer readable medium contains program instructions for controlling a charging connector anti-theft apparatus that: verify a connection between a socket of a vehicle and a charging plug included in a charging connector outside of the vehicle; control the socket and the charging plug to be locked upon initiation of charging the vehicle; determine unlock conditions of the charging plug based on a user authentication result; and control an output unit to output a warning sound or warning light upon reception of a separation signal indicating that the socket and the charging plug have been separated when the determined unlock conditions are not satisfied.

The electric vehicle charging connector anti-theft method and apparatus according to the present disclosure have at least the following advantages.

Firstly, the present disclosure prevents theft of the charging connector and suspension of charging by other people during an extended charging time in the absence of a user, and thus, the user can use the charging connector more safely and stably during vehicle charging. Secondly, the present disclosure stably maintains a connected state of the charging apparatus and the vehicle by controlling a locking/unlocking the charging plug of the charging apparatus and the vehicle socket. Thirdly, the present disclosure modifies only control logic using an existing smart-key system (SMK) for user authentication, thereby avoiding cost increase. Fourthly, the present disclosure is flexibly applicable since the user can turn the anti-theft system on/off as necessary.

The effects of the present disclosure are not limited to the above-described effects and other effects which are not described herein will become apparent to those skilled in the art from the following description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 4 illustrates additional operation of a latch of an electric vehicle charging connector anti-theft apparatus according to embodiments of the present disclosure.

DETAILED DESCRIPTION OF THE DISCLOSURE

Figure 1:
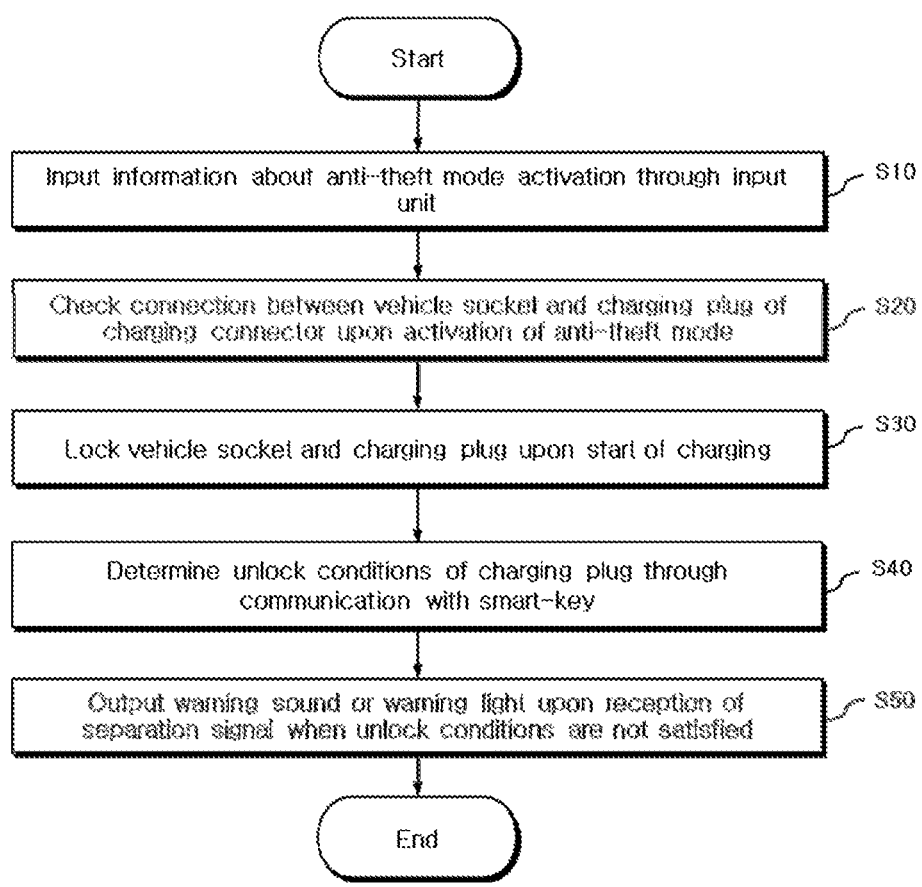
FIG. 1 is a flowchart illustrating an electric vehicle charging connector anti-theft method according to embodiments of the present disclosure.

Reference will now be made in detail to the embodiments of the present disclosure, examples of which are illustrated in the accompanying drawings. Although the suffixes "module" and "unit" are used for constituent elements described in the following description, this is intended only for ease of description in the specification.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one charging connector anti-theft controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the following description of the present disclosure, a detailed description of known functions and configurations incorporated herein will be omitted when it may obscure the subject matter of the present disclosure.

Generally, an EV or a PHEV needs to be charged in a garage or outdoors, several hours (e.g., 4 hours) may be taken to fully charge the vehicle, and a user may leave the vehicle unattended during charging. The present disclosure enables the user to charge the vehicle while an anti-theft system is activated when the user charges the vehicle using an individual charging connector such that the user can leave the vehicle unattended for a long charging time.

The present disclosure provides a lock/unlock device for automatically locking/unlocking a charging connector connected to a connecting part (e.g., a socket of an EV or PHEV) of an EV or PHEV only when the user is authenticated using smart-key information of the user.

Therefore, the following features are described hereinbelow: a method for activating an anti-theft mode of the charging connector; a method for recognizing a user and unlocking the charging connector when the anti-theft mode is activated; a method for warning of separation of the charging connector when the user is not recognized (i.e., unlock conditions are not satisfied); and a method for locking the charging connector during charging while the anti-theft mode is activated. As a result, when the user activates the anti-theft mode, it is possible to lock the socket of the corresponding vehicle and the charging plug of the charging connector, to unlock the charging plug according to a smart-key, and to warn of an attempt to separate the charging connector when unlock conditions are not satisfied.

Referring now to the presently disclosed embodiments, FIG. 1 is a flowchart illustrating an EV charging connector anti-theft method according to embodiments of the present disclosure.

As shown in FIG. 1, information about whether the anti-theft mode is activated by a user is input through an input unit of an EV charging connector anti-theft apparatus (S10).

The anti-theft mode of the charging connector may be activated through the input unit, and the input unit may be included in a display device of a cluster or an Audio, Video, Navigation (AVN) system.

The input unit can receive information about anti-theft mode on/off from the user through a menu of a user interface of the cluster or the AVN system.

When the anti-theft mode is activated through the cluster or the AVN system, information about anti-theft mode activation is transmitted to the charging connector anti-theft apparatus through an internal communication line (e.g., controller area network (CAN), local interconnect network (LIN), hard-wired communication line, etc.) of the vehicle and stored in a memory of the charging connector anti-theft apparatus.

Upon activation of the anti-theft mode, the charging connector anti-theft apparatus verifies (or checks) the connection between the socket of the vehicle and the charging plug included in the charging connector (S20).

In embodiments of the present disclosure, the charging connector anti-theft apparatus may verify the connection between the socket of the vehicle and the charging connector using a sensor which senses a current or voltage between the charging connector and the socket of the vehicle.

Upon start of charging, the charging connector anti-theft apparatus locks the vehicle socket and the charging connector (S30).

When the charging connector is connected to the vehicle socket and charging is started while the anti-theft mode is activated, the charging connector anti-theft apparatus locks the charging connector such that the charging connector cannot be separated from the vehicle socket.

Upon expiration of a long slow charging time for the EV or PHEV, the charging connector anti-theft apparatus collects information about a user authentication result from a user authentication system which can communicate with a smart-key and determines whether unlock conditions of the charging plug are satisfied based on the collected information (S40).

User recognition when the charging connector anti-theft mode is set can be performed in a manual mode in which the user is recognized when a charging connector separation button is pressed and in an automatic mode in which the user is automatically recognized when approaching a charging apparatus.

Unlocking is performed by authenticating the user through the smart-key when the user presses the separation button of the charging connector (i.e., manual mode) or by determining whether the corresponding user is an authenticated user through the smart-key when the user approaches the vehicle and determining the unlock conditions (i.e., automatic mode).

Specifically, the charging connector anti-theft apparatus determines the unlock conditions of the charging plug upon reception of a separation signal from the separation button or whenever the user authentication system receives a user authentication signal from the smart-key at predetermined intervals.

When the unlock conditions are not satisfied, the charging connector anti-theft apparatus outputs warning sound or warning light upon reception of the separation signal (S50). If the unlock conditions are not satisfied, a fastening device (e.g., latch) of the vehicle socket fixes the charging connector such that the charging connector cannot be separated from the vehicle socket when the user presses the separation button of the charging connector.

On the other hand, if the unlock conditions are satisfied, the charging connector can be separated without an additional lock operation when the user presses the separation button of the charging connector.

When the user is not recognized, the charging connector cannot be separated when there is an attempt to separate the charging connector, and the attempt can trigger an alarm. When there is an attempt to unlock the charging connector while the user is not recognized, a warning sound can be output for a predetermined time through an external buzzer, or the like, of the vehicle so as to prevent an unauthenticated person from stealing or separating the charging connector.

Additionally, the charging connector anti-theft apparatus may turn on a warning light of the vehicle while outputting the warning sound.

A lock/unlock operation is performed according to whether the user is authenticated, and the charging connector anti-theft apparatus controls operation of an actuator for locking/unlocking on the basis of communication information (e.g., H/Wire or CAN communication information) transmitted from the user authentication system.

The actuator is a motor using electricity, oil pressure or compressed air. In general, the actuator refers to an apparatus performing mechanical operation using fluidic energy. In embodiments of the present disclosure, the actuator is used for operation of the latch and controlled by the charging connector anti-theft apparatus.

Figure 2:
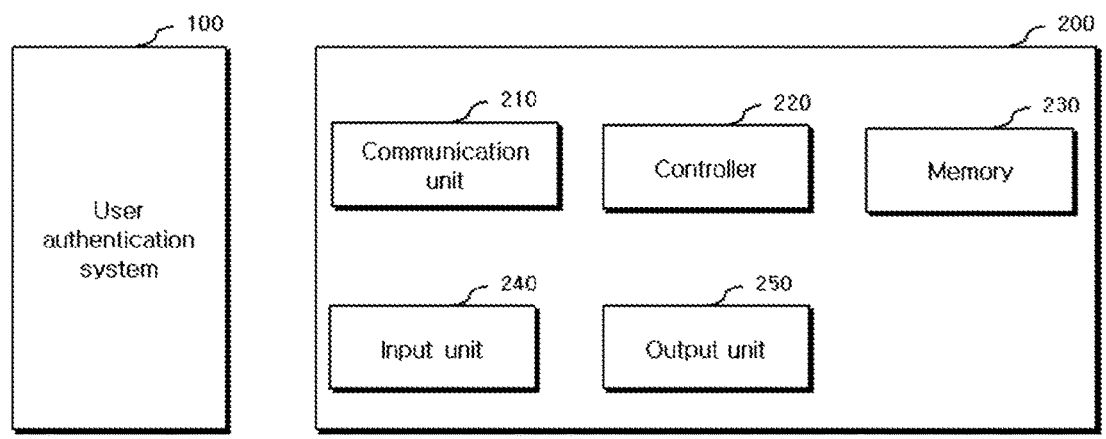
FIG. 2 is a block diagram of an electric vehicle charging connector anti-theft apparatus according to embodiments of the present disclosure.

FIG. 2 is a block diagram of an EV charging connector anti-theft apparatus according to embodiments of the present disclosure.

As shown in FIG. 2, the charging connector anti-theft apparatus 200, which receives authentication result information from a user authentication system 100, may include a communication unit 210, a controller 220, a memory 230, an input unit 240 and an output unit 250. The components shown in FIG. 2 are not mandatory and the charging connector anti-theft apparatus 200 may include more components or fewer components.

A description will be given of the user authentication system 100 prior to the components of the charging connector anti-theft apparatus.

The user authentication system 100 may include an RF communication transmission/reception module for communicating with a smart-key (not shown). The user authentication system 100 determines whether the corresponding user is an authenticated user through RF communication with the smart-key. The user authentication system 100 receives a user authentication signal through RF communication with the smart-key using a specific frequency and determines whether the user is an authenticated user by comparing the received user authentication signal with prestored user information. The user authentication system 100 delivers the authentication result to the charging connector anti-theft apparatus 200 through vehicle communication. The user authentication system 100 may be a smart-key system (SMK) and the SMK can perform RF communication with the smart-key.

In embodiments of the present disclosure, the SMK may receive a user recognition signal from the smart-key and authenticate the corresponding user by comparing the received user recognition signal with prestored user information.

The communication unit 210 transmits/receives signals and data for performing charging connector anti-theft mode control to/from the SMK 100. In embodiments of the present disclosure, the communication unit 210 can receive information about an authentication result from the SMK 100.

The controller 220 may perform data processing and operations for controlling the overall operation of the charging connector anti-theft apparatus 200.

In embodiments of the present disclosure, upon activation of the anti-theft mode, the controller 220 can verify the connection between the socket of the vehicle and the charging plug of the charging connector, control the vehicle socket and the charging plug to be locked upon start of charging, and determine unlock conditions of the charging plug based on the user authentication result.

The memory 230 is a space and/or a storage area storing predetermined program code for controlling the overall operation of the charging connector anti-theft apparatus 200 and data input/output when operation according to the program code is performed and is provided in the form of an electrically erasable and programmable read only memory (EEPROM), a flash memory, a hard disk drive, or the like.

The input unit 240 receives information about whether the anti-theft mode is activated from the user.

In embodiments of the present disclosure, the input unit 240 can be included in a display device of a cluster or an AVN system and can receive information about whether the anti-theft mode is activated through a user interface of the cluster or the AVN system.

The output unit 250 may include a buzzer or a warning light for warning when there is an attempt to separate the charging connector while the unlock conditions are not satisfied.

Figure 3:
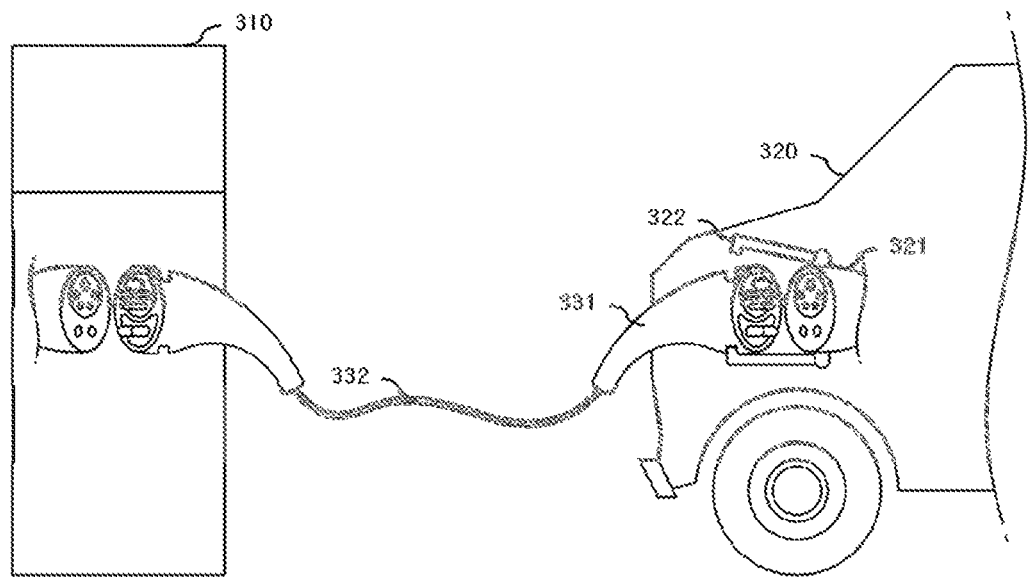
FIG. 3 illustrates operation of a latch of an electric vehicle charging connector anti-theft apparatus according to embodiments of the present disclosure.

FIG. 3 illustrates operation of a latch of an EV charging connector anti-theft apparatus according to embodiments of the present disclosure.

As shown in FIG. 3, a charging connector is connected between a charging system 310 and an EV 320.

In general, an EV or a PHEV is equipped with the charging connector, and the charging connector can be used to charge the battery of the EV or PHEV irrespective of slow charging or quick charging.

The charging connector may include a charging plug 331 and a cable 332 for delivering electric power.

When the charging connector is connected to a socket 321 of the EV 320, the charging connector anti-theft apparatus 200 checks the connection and controls an actuator (not shown) such that a latch 322 of the socket 321 of the EV 320 is inserted into a latch groove included in the charging plug and locked upon start of charging.

The latch 322 is inserted into the latch groove to lock the vehicle socket 321 and the charging plug 331. Upon authentication of the user, the charging connector anti-theft apparatus 200 can control the actuator to separate the latch 322 from the latch groove.

FIG. 4 illustrates additional operation of a latch of an EV charging connector anti-theft apparatus according to another embodiment of the present disclosure.

As shown in FIG. 4, a vehicle socket 411 includes a latch 412 and a charging plug 421 includes a latch groove 422.

When the charging plug 421 is connected to the vehicle socket 411, the latch 412 is inserted into the latch groove 422. The latch 412 is fixed and locked into the latch groove 422 by an actuator (not shown) controlled by the charging connector anti-theft apparatus or separated and unlocked from the latch groove 422 by the actuator.

Although embodiments of the present disclosure have been described for illustrative purposes, those skilled in the art will appreciate that various modifications, additions and substitutions are possible, without departing from essential characteristics of the disclosure. Thus, embodiments disclosed herein are only exemplary and are not to be considered as limitative of the disclosure. Accordingly, the scope of the disclosure is not to be limited by the above aspects but by the claims and the equivalents thereof.

What is claimed is:

1. A method for controlling a charging connector anti-theft apparatus, comprising:
    verifying a connection between a socket of a vehicle and a charging plug included in a charging connector outside of the vehicle;
    locking the socket and the charging plug upon initiation of charging the vehicle;

determining unlock conditions of the charging plug based on a user authentication result received through communication with a smart key;

outputting a warning sound or warning light upon reception of a separation signal indicating that a separation button is pressed when the determined unlock conditions are not satisfied; and maintaining a lock state between the socket and the charging plug when the warning sound or the warning light is outputted.

2. The method according to claim 1, further comprising:
receiving information about whether an anti-theft mode is activated through an input unit,
wherein the locking of the socket and the charging plug is performed when the anti-theft mode is activated.

3. The method according to claim 1, wherein the determining of the unlock conditions of the charging plug comprises:
receiving the user authentication result from a user authentication system that receives a user authentication signal from the smart-key.

4. The method according to claim 3, wherein the determining of the unlock conditions of the charging plug is performed when the separation signal is received from a separation button or when the user authentication system receives the user authentication signal from the smart-key at predetermined intervals.

5. The method according to claim 1, wherein the verifying of the connection between the socket and the charging plug comprises:
verifying the connection by sensing a current or voltage between the socket and the charging plug.

6. The method according to claim 5, wherein the locking of the socket and the charging plug comprises:
locking the socket and the charging plug through a latch included in the socket upon transmission of electric power from the charging plug to the socket.

7. The method according to claim 6, wherein the locking of the socket and the charging plug comprises:
moving the latch to the charging plug by an actuator configured to be inserted and locked into a latch groove included in the charging plug.

8. The method according to claim 2, wherein the input unit is included in a display device of a cluster or an Audio, Video, Navigation (AVN) system.

9. The method according to claim 8, wherein the input unit receives information about whether the anti-theft mode is activated through a user interface of the cluster or the AVN system.

10. The method according to claim 3, further comprising:
comparing, by the user authentication system, the user authentication signal with prestored user information; and
generating, by the user authentication system, the user authentication result based on the comparison.

11. A charging connector anti-theft apparatus, comprising:
a controller verifying a connection between a socket of a vehicle and a charging plug included in a charging connector outside of the vehicle, controlling the socket and the charging plug to be locked upon initiation of charging the vehicle, and determining unlock conditions of the charging plug based on a user authentication result;

a communication unit receiving information about the user authentication result from a user authentication system in communication with a smart-key; and an output unit outputting a warning sound or warning light upon reception of a separation signal from the communication unit indicating that a separation button is pressed when the determined unlock conditions are not satisfied, wherein the controller maintains a lock state between the socket and the charging plug when the warning sound or the warning light is outputted.

12. The charging connector anti-theft apparatus according to claim 11, further comprising:
an input unit receiving information about whether an anti-theft mode is activated,
wherein the socket and the charging plug are locked when the anti-theft mode is activated.

13. The charging connector anti-theft apparatus according to claim 11, wherein:
the user authentication system receives a user authentication signal from the smart-key.

14. The charging connector anti-theft apparatus according to claim 13, wherein the controller determines the unlock conditions when the separation signal is received from a separation button or when the user authentication system receives the user authentication signal from the smart-key at predetermined intervals.

15. The charging connector anti-theft apparatus method according to claim 11, wherein the controller verifies the connection between the socket and the charging plug by sensing a current or voltage between the socket and the charging plug.

16. The charging connector anti-theft apparatus according to claim 15, wherein the controller controls the socket and the charging plug to be locked through a latch included in the socket upon transmission of electric power from the charging plug to the socket.

17. The charging connector anti-theft apparatus according to claim 16, wherein the controller controls the latch to be moved to the charging plug by an actuator configured to be inserted and locked into a latch groove included in the charging plug.

18. The charging connector anti-theft apparatus according to claim 12, wherein the input unit is included in a display device of a cluster or an AVN system.

19. The charging connector anti-theft apparatus according to claim 18, wherein the input unit receives information about whether the anti-theft mode is activated through a user interface of the cluster or the AVN system.

20. The charging connector anti-theft apparatus according to claim 13, wherein the user authentication system compares the user authentication signal with prestored user information and generates the user authentication result based on the comparison.

* * * * *